No. 735,941. Patented August 11, 1903.

UNITED STATES PATENT OFFICE.

ARTHUR W. BURWELL, OF CLEVELAND, OHIO, ASSIGNOR TO ELMER A. SPERRY, AGENT, OF CLEVELAND, OHIO.

COMPOUND FOR USE IN TINNING-BATHS.

SPECIFICATION forming part of Letters Patent No. 735,941, dated August 11, 1903.

Application filed December 3, 1900. Serial No. 38,531. (No specimens.)

*To all whom it may concern:*

Be it known that I, ARTHUR W. BURWELL, a citizen of the United States, residing at Cleveland, in the county of Cuyahoga and State of Ohio, have invented a new and useful Compound for Use in Tinning-Baths, of which the following is a specification.

My invention relates to an oleaginous compound or "oil" for tinning-baths; and it consists in a mechanical mixture of substances which have been found to possess in a high degree all the qualities necessary or desirable in what may be termed a "fluxing" luster-oil. The office and purpose of such an oil is, first, to enable the temperature of the molten tin to be transmitted to the plate for a considerable period after the plate has left the surface of the tin and during which it is being drawn upwardly through the mass of oil, the density of which being only about one-tenth allows the tin while yet in a perfectly molten state to easily flow downwardly off the sheet. This is accomplished without deposit of carbonaceous material on the surface of the plate only by an oil or compound of high fire test. Secondly, it is found that the oil must have certain qualities, known as "fluxing" qualities, whereby the tin is made to adhere in a more uniform and much thinner layer to the surface. Thirdly, while it may have fluxing qualities and be of high fire test, yet it is often found that the tin will appear dull and with insufficient luster and brightness. It must, therefore, be a "luster-oil" or a compound which develops a high degree of finish and luster. Fourth, the oil or compound of materials must be such that it will not quickly "freeze" upon the surface of the tin, and thus be wasted, and require mechanical removal before the tin is suitable for the market. This last quality is found to be determined by or related in some manner to the chill test of the compound.

The following compound is found to possess all of the above qualities in a marked degree, and consists in a mechanical mixture of mineral oil having a boiling-point above that of molten tin—such, for instance, as a good quality of "cylinder stock," (which has a specific gravity of about 30° Baumé or below, (produced in the last stages of mineral-oil refining—with an unsaturated fat-acid, such as free oleic acid or a mixture containing free oleic acid, preferably a mixture of palmitic, stearic, and free oleic acids, and preferably rich in the last-named acid. These materials I prefer to mix while in the heated or molten state, although this mixture might be made in all probabilty while they are cold with proper apparatus. These materials I have mixed and tested in various proportions; but I have found about two-thirds of the mineral stock with one-third of the acid to give excellent results, although I do not wish to be limited to this proportion or ratio of ingredients, nor do I wish to be restricted to the exact methods herein described.

I am aware that terne and tin plates have been treated with a compound composed of olive, linseed, petroleum, and palm oils; but my compound is distinguished therefrom by the fact that it is free from drying-oils and is therefore not a compound which will adhere to the plates as a protecting-coating.

What I claim as new, and desire to secure by Letters Patent, is—

1. A combined fluxing and luster-oil for tinning-baths consisting of non-drying ingredients comprising a mineral oil having a boiling-point above the temperature of molten tin and a material rich in free oleic acid.

2. A combined fluxing and luster oil for tinning-baths, consisting of non-drying ingredients comprising a mineral oil having a boiling-point above the temperature of molten tin, and palmitic, stearic, and free oleic acids.

In testimony whereof I have hereunto set my hand in presence of two subscribing witnesses.

ARTHUR W. BURWELL.

Witnesses:
ELMER A. SPERRY,
D. T. DAVIES.